(12) United States Patent
Ayyagari et al.

(10) Patent No.: US 7,733,885 B2
(45) Date of Patent: Jun. 8, 2010

(54) EXTENDING ACCESS TO A DEVICE IN A LIMITED CONNECTIVITY NETWORK TO DEVICES RESIDING OUTSIDE THE LIMITED CONNECTIVITY NETWORK

(75) Inventors: Arun Ayyagari, Seattle, WA (US); Salim S. AbiEzzi, Kirkland, WA (US); William Michael Zintel, Kenmore, WA (US); Timothy M. Moore, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1421 days.

(21) Appl. No.: 10/977,167

(22) Filed: Oct. 29, 2004

(65) Prior Publication Data

US 2005/0058144 A1    Mar. 17, 2005

Related U.S. Application Data

(60) Division of application No. 09/784,474, filed on Feb. 15, 2001, now abandoned, and a continuation-in-part of application No. 09/556,565, filed on Apr. 24, 2000, now Pat. No. 6,922,548.

(60) Provisional application No. 60/199,581, filed on Apr. 25, 2000, provisional application No. 60/184,116, filed on Feb. 18, 2000.

(51) Int. Cl.
*H04L 12/38* (2006.01)
*H04L 12/56* (2006.01)

(52) U.S. Cl. ............... 370/401; 370/278; 370/328; 370/349; 370/313; 370/338; 370/255; 714/748; 714/751; 709/250; 709/230; 455/41.2; 455/466

(58) Field of Classification Search ............ 370/278, 370/328, 349, 313, 401, 338, 255; 714/748, 714/751; 709/227, 250, 230; 455/41.2, 466
See application file for complete search history.

(56) References Cited

U.S. PATENT DOCUMENTS

| | | | | |
|---|---|---|---|---|
| 4,841,526 A | * | 6/1989 | Wilson et al. | 714/748 |
| 5,677,918 A | * | 10/1997 | Tran et al. | 714/748 |
| 5,717,689 A | * | 2/1998 | Ayanoglu | 370/349 |
| 5,727,212 A | * | 3/1998 | Dinallo | 719/321 |
| 5,740,160 A | * | 4/1998 | Ikegami et al. | 370/255 |
| 5,754,754 A | * | 5/1998 | Dudley et al. | 714/18 |
| 6,058,106 A | * | 5/2000 | Cudak et al. | 370/313 |
| 6,470,397 B1 | * | 10/2002 | Shah et al. | 709/250 |
| 6,480,711 B1 | * | 11/2002 | Guedalia | 455/412.1 |
| 6,600,726 B1 | * | 7/2003 | Nevo et al. | 370/278 |

(Continued)

*Primary Examiner*—Marceau Milord

(57) ABSTRACT

The invention makes possible remote control of devices in a piconet by remote users communicating over the Internet and the like by providing a proxy-bridge device. The proxy-bridge device is a bridge for sending packets to and from between an external device and a device in the piconet. Moreover, the proxy-bridge device also serves as a proxy for the external device to devices in the piconet and as a proxy for devices in the piconet accessing an external device. The proxy-bridge wireless device's protocol stack allows communications with the piconet devices within the piconet. In addition, the protocol stack allows an application to communicate with a remote device e.g., via the Internet Protocol. Thus, the proxy-bridge device, using two protocols, enables remote users discover the presence of a service offered by a device in a piconet as a logical embedded device within the proxy-bridge device and vice-versa.

16 Claims, 10 Drawing Sheets

U.S. PATENT DOCUMENTS

| | | | |
|---|---|---|---|
| 6,600,902 B1 * | 7/2003 | Bell | 455/41.2 |
| 6,603,744 B2 * | 8/2003 | Mizutani et al. | 370/310 |
| 6,704,293 B1 * | 3/2004 | Larsson et al. | 370/255 |
| 6,748,195 B1 * | 6/2004 | Phillips | 455/41.2 |
| 6,751,200 B1 * | 6/2004 | Larsson et al. | 370/255 |
| 6,760,319 B1 * | 7/2004 | Gerten et al. | 370/335 |
| 6,775,258 B1 * | 8/2004 | van Valkenburg et al. | 370/338 |
| 6,792,286 B1 * | 9/2004 | Bharath et al. | 455/554.2 |
| 6,842,460 B1 * | 1/2005 | Olkkonen et al. | 370/465 |
| 6,850,519 B1 * | 2/2005 | Saito et al. | 370/389 |
| 6,879,570 B1 * | 4/2005 | Choi | 370/329 |
| 6,885,847 B1 * | 4/2005 | Lumelsky | 455/41.2 |
| 6,886,095 B1 * | 4/2005 | Hind et al. | 713/168 |
| 6,907,044 B1 * | 6/2005 | Yonge et al. | 370/445 |
| 6,920,171 B2 * | 7/2005 | Souissi et al. | 375/133 |
| 6,922,548 B1 * | 7/2005 | Moore et al. | 455/41.2 |
| 6,954,443 B2 * | 10/2005 | Forstadius et al. | 370/331 |
| 6,959,439 B1 * | 10/2005 | Boike | 719/326 |
| 6,975,613 B1 * | 12/2005 | Johansson | 370/338 |
| 6,982,962 B1 * | 1/2006 | Lunsford et al. | 370/278 |
| 7,003,463 B1 * | 2/2006 | Maes et al. | 704/270.1 |
| 7,082,114 B1 * | 7/2006 | Engwer et al. | 370/331 |
| 7,089,298 B2 * | 8/2006 | Nyman et al. | 709/220 |
| 7,103,313 B2 * | 9/2006 | Heinonen et al. | 455/41.2 |
| 7,136,914 B2 * | 11/2006 | Motoyama | 709/223 |
| 7,184,707 B2 * | 2/2007 | Tada et al. | 455/41.3 |
| 7,194,760 B2 * | 3/2007 | Nordman et al. | 726/5 |
| 7,218,644 B1 * | 5/2007 | Heinonen et al. | 370/468 |
| 7,222,160 B2 * | 5/2007 | Hlasny | 709/217 |
| 7,266,104 B2 * | 9/2007 | Belcea | 370/338 |

* cited by examiner

EXTENDING ACCESS TO A DEVICE IN A LIMITED CONNECTIVITY NETWORK TO DEVICES RESIDING OUTSIDE THE LIMITED CONNECTIVITY NETWORK

This application is a divisional of U.S. patent application Ser. No. 09/784,474 filed on Feb. 15, 2001 now abandoned by the present inventors and assigned to the present assignee, said application entitled "A Proxy-Bridge Connecting Remote Users to a Limited Connectivity Network." Said application (Ser. No. 09/784,474) claims the benefit of U.S. Provisional Patent Application 60/199,581 filed on Apr. 25, 2000.

Said application (Ser. No. 09/784,474) is a continuation-in-part of U.S. patent application Ser. No. 09/556,565 filed on Apr. 24, 2000 now U.S. Pat. No. 6,922,548 by the present inventors and assigned to the present assignee, entitled "Providing Remote Network Driver Interface Specification Services Over a Wireless Radio-Frequency Medium" which claims the benefit of U.S. Provisional Patent Application No. 60/184,116, filed on Feb. 18, 2000.

CROSS-REFERENCE TO RELATED APPLICATIONS

The present application is related to U.S. patent application Ser. No. 10/977,021, filed concurrently herewith by the present inventors and assigned to the present assignee, said application entitled "Managing Packet Transmissions Between a Device in a Limited Connectivity Network and a Device Residing Outside the Limited Connectivity Network."

TECHNICAL FIELD

This invention relates generally to networking computing devices extending the reach of a network formed by devices with limited connectivity to allow remote users and networks access services offered by the limited connectivity network. In particular, the invention relates to network bridging devices communicatively coupling heterogeneous networks.

BACKGROUND OF THE INVENTION

A class of stripped wireless devices operate within computer networks and typically communicate over small distances and relatively low bandwidths. Such stripped down wireless devices, while mobile, are capable of directly communicating with a rather small number of other devices. Such devices have limited resources and are significantly limited in comparison to wireless devices. For instance, the BLUETOOTH ("BT") specifications, version 1.0 B, which are herein incorporated by reference in its entirety, describe stripped down wireless devices at different levels of complexity. A BT device has limited range and connectivity, typically within thirty feet of another BT device and to no more than seven other such devices.

The BT system provides for communications between two devices over a common channel using a point-to-point connection or communications between several devices over a common channel via a point-to-multipoint connection. Two or more devices sharing the same channel form a piconet. During communications in a piconet, typically, one device assumes the role of a master device controlling the small number of devices within the piconet. A particular device can participate in more than one piconet, of course, with each piconet having its own channel.

The profile of a BT device provides information about the services available at the device. Thus, a BT compliant cell phone discloses its possible settings, state and other relevant information in its profile. Further, the cell phone may be controlled within a piconet by commands issued by another device. However, it is not presently feasible for remote users, who are outside the reach of the piconet, to control or query the cell phone due to the different protocols employed for operating stripped-down devices, e.g., BT, as opposed to wireless devices in general, e.g., IEEE 802.11. Similarly, a BT device cannot discover services available at a new server device joining a piconet without periodically polling for service discovery.

Discovery and control of devices over the expanse of large networks is possible, e.g., in accordance with the Universal Plug and Play specification ("UPnP"). A copy of the specification is attached to this application for incorporation herein by reference in its entirety. UPnP specifies a method for control and data transfer based on the IP protocol. Specifically UPnP enables a controller or control point to communicate with devices to be controlled over a network. In order to enable such communications, each device to be controlled is required to have an IP address and a Dynamic Host Control Protocol ("DHCP") client. In the absence of a DHCP server, a UPnP compliant device obtains an IP address via Auto IP.

Given UPnP compliant devices with their own IP addresses, a control point can discover them using a discovery message. The control point obtains the capabilities of a discovered device and logical devices within it by retrieving the description of the device provided in the Extensible Markup Language ("XML"). Following the acquisition of the description, the control point can send actions to the device, e.g., using XML with the aid of the Simple Object Access Protocol ("SOAP").

UPnP compliant devices and control points advertise their capabilities using multicast discovery messages, i.e., messages addressed to more than one recipient, to which all devices are required to listen and respond. For instance, in response to a multicast discovery message sent by a control point, responding devices send unicast messages addressed to the control point. Furthermore, UPnP allows a physical device to include several logical devices. In such instance a root device description may include several embedded device descriptions in a single description. Alternatively, the several embedded devices may provide their own distinct descriptions.

The device description provided by the device vendor is based on a template for the particular device type. Service descriptions, also in XML and provided by the vendor, include a list of commands that the device responds to and arguments in the commands. A control point obtains these service and device descriptions by issuing a "GET" command, in accordance with the hypertext transfer protocol (HTTP), to the relevant device. Similarly, a control point obtains the value of one or more state variables for a device by querying it.

UPnP also allows a control point to track changes in a state variable by subscribing to an eventing service. Event messages provided by a publisher disclose any change in the state variable to the subscribers. Thus, both polling and broadcasting facilitate communications between devices and control points in accordance with UPnP.

Stripped down wireless devices usually cannot support the overhead required for compatibility with UPnP. The UPnP requirement for IP addresses, support for HTTP and extendable markup language (XML) and the like are not readily met by all stripped down wireless devices, although, some stripped down wireless devices offer support for HTTP and XML. Such limitations on stripped down wireless devices result in incompatibility between devices that can be controlled via the Internet and stripped down wireless devices limited to a piconet in various degrees.

SUMMARY OF THE INVENTION

The invention makes possible remote access to and/or control of wireless devices including those forming a piconet, e.g., BT compliant devices, without requiring extensive changes to existing devices by introducing a proxy-bridge wireless device.

The proxy-bridge wireless device has a stack enabling communications with the wireless devices in accordance with standard wireless device specifications. In addition, the stack allows a remote application to communicate with a device over the Internet or a subnet. Thus, the proxy-bridge device can communicate using two protocols. Within the piconet the proxy-bridge device assumes the role of the master device. Thus, to devices in the piconet requests for services appear to be made by the proxy-bridge device acting as a proxy for remote devices and applications. Devices outside the piconet can view the capabilities of individual piconet devices with the proxy-bridge device acting as a bridge.

In an embodiment of the invention, the capabilities of wireless devices are made available in accordance with the universal plug-and-play (UPnP) specification to enable queries to the proxy-bridge device by users communicating over the Internet or a subnet to discover the presence of a suitable wireless device. The proxy-bridge device maintains a table to map IP addresses to particular wireless devices to facilitate specific control of the wireless devices by a remote user through IP addresses. Thus, the proxy-bridge device is a bridge forwarding requests from outside the piconet to a device in the piconet. The proxy-bridge device is also a proxy for the remote devices since it represents them to piconet devices.

In addition, some embodiments of the invention provide UPnP services directly over a BT device's stack without requiring support for IP. This enables such a device to discover and advertise its services in accordance with UPnP while communicating with other similar devices or while communicating with external devices via a proxy-bridge device. Extension of UPnP to a limited connectivity network such as a BT piconet via a suitable bridge requires transparent management UPnP features such as discovery, description, control and eventing into commands in the limited connectivity network.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

It is desirable to provide users with the ability to interconnect devices with no more effort than placing the devices at a desired location. For instance, a toaster close to a coffee machine and an air conditioner should be able to interconnect with them to form a network to allow centralized control and monitoring. In part, wireless connections between devices enable inter-device interaction without physical wires. In some applications it is desirable to provide more extensive connectivity to allow remote control of the devices from across the Internet or discovery of remote services by devices in such networks. Presently, this is not possible without using more sophisticated devices with significantly more resources.

The invention described herein provides such remote control of devices in small networks, e.g., piconets conforming to the BT specification without requiring extensive changes to existing devices by providing a proxy-bridge wireless device.

In particular, the proxy-bridge wireless device implements a protocol stack such that the proxy-bridge device is just another device in the piconet to other devices in the piconet. To devices outside the piconet the proxy-bridge device appears to have several embedded individually addressable logical devices, typically corresponding to the devices in the piconet. To devices within the piconet, the proxy-bridge device offers services available outside the piconet as if the proxy-bridge device provides them itself. Hence, the proxy-bridge device serves as a proxy both ways and a bridge between external devices and the piconet.

Moreover, the invention includes modifying the protocol stack of piconet devices to enable plug and play capability without requiring support for IP by using piconet compatible packets to carry data and actions using XML and HTTP.

Figure 1:
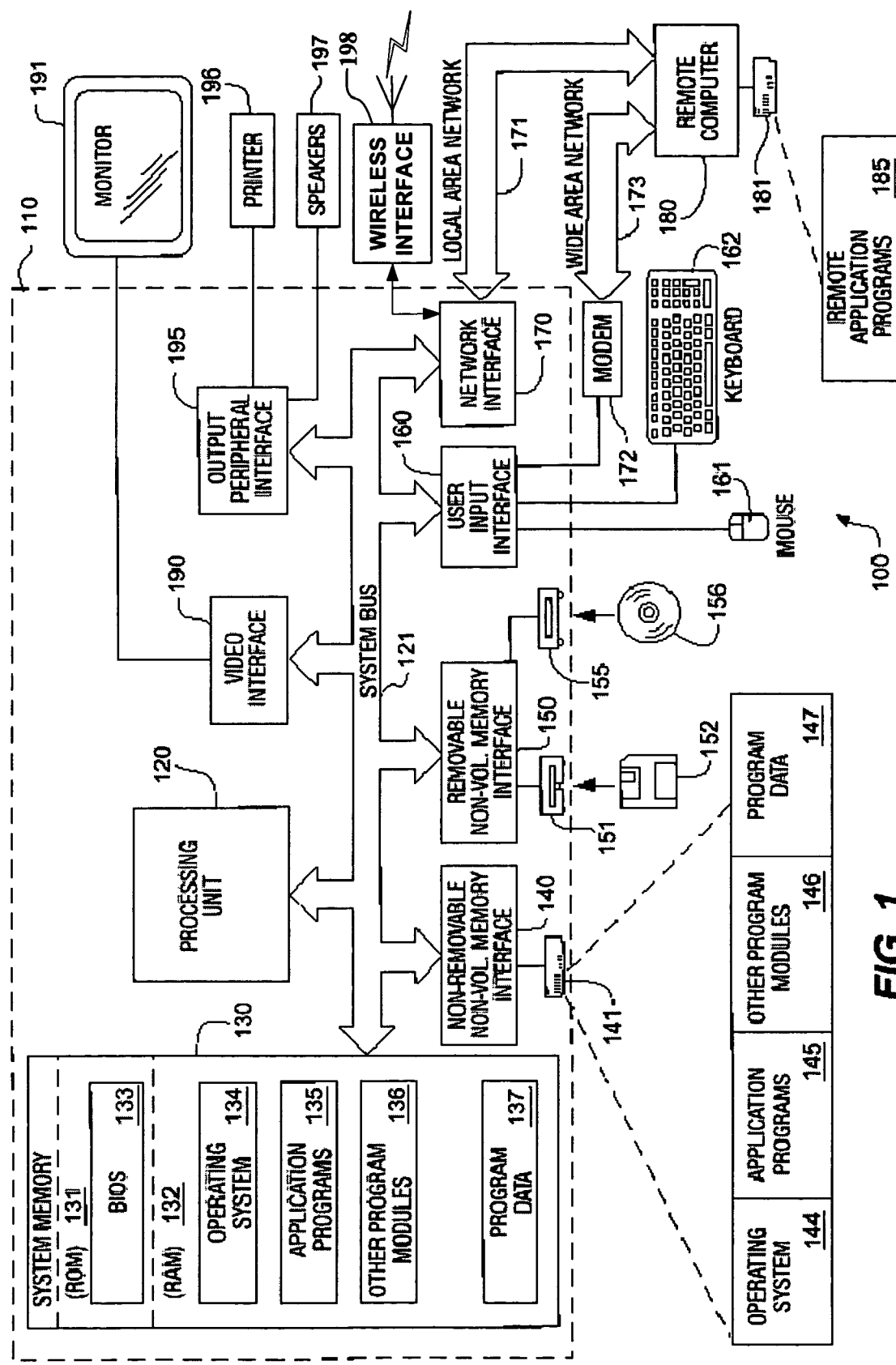
FIG. 1 is a block diagram generally illustrating an exemplary computer system on which the present invention may reside.

Some of the devices, whether in the piconet or remote to the piconet, provide computing environments similar to the computing environment illustrated in FIG. 1. Of course, the invention does not require the resources and sub-devices illustrated in FIG. 1. In fact, the piconet devices will not include many of the components depicted in FIG. 1 such as a hard drive for data storage.

Turning to the drawings, wherein like reference numerals refer to like elements, the invention is illustrated as being implemented in a suitable computing environment. Although not required, the invention will be described in the general context of computer-executable instructions, such as program modules, being executed in a computing environment. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general-purpose or special-purpose computing system environments or configurations. Examples of well-known computing systems, environments, and configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), EEPROM, flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can accessed by the computer 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computer 110, such as during start-up, is typically stored in ROM 131. RAM 132 typically contains data and program modules that are immediately accessible to or presently being operated on by processing unit 120. By way of example, and not limitation, FIG. 1 illustrates an OS 134, application programs 135, other program modules 136, and program data 137. Often, the OS 134 offers services to applications programs 135 by way of one or more application programming interfaces (APIs) (not shown). Because the OS 134 incorporates these services, developers of applications programs 135 need not redevelop code to use the services. Examples of APIs provided by OSs such as Microsoft's "WINDOWS" are well known in the art.

The computer 110 may also include other removable/non-removable, volatile/nonvolatile computer storage media. By way of example only, FIG. 1 illustrates a hard disk interface 140 that reads from and writes to non-removable, nonvolatile magnetic media, a magnetic disk drive 151, which may be internal or external, that reads from and writes to a removable, nonvolatile magnetic disk 152, and an optical disk drive 155 that reads from and writes to a removable, nonvolatile optical disk 156 such as a CD ROM. Other removable/non-removable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141, which may be internal or external, is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer-readable instructions, data structures, program modules, and other data for the computer 110. In FIG. 1, for example, hard disk drive 141 is illustrated as storing an OS 144, application programs 145, other program modules 146, and program data 147. Note that these components can either be the same as or different from the OS 134, application programs 135, other program modules 136, and program data 137. The OS 144, application programs 145, other program modules 146, and program data 147 are given different numbers here to illustrate that they may be different copies. A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, and scanner. These and other input devices are often connected to the processing unit 120 through a user interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171, personal area network (PAN) and a wide area network (WAN) 173, and a wireless interface 198 complete with an antenna, but may also include other networks. Some examples of contemplated networking protocols include those compliant with BLUETOOTH™, UPnP™, JINI™, SALUTATION™ and IETF SLP. Such networking environments are commonplace in offices, enterprise-wide computer networks, intranets, and the Internet or are expected to be introduced in the near future.

A computing device with both wireless and LAN/PAN connectivity, as depicted in FIG. 1, is suitable for implementing a proxy-bridge device in accordance with the invention. However, FIG. 1 is an exemplary depiction of a proxy-bridge device and does not limit the possible embodiments of the claimed invention as is apparent to one of ordinary skill in the art.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or via another appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181, which may be internal or external to the remote computer 180. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

Figure 2:
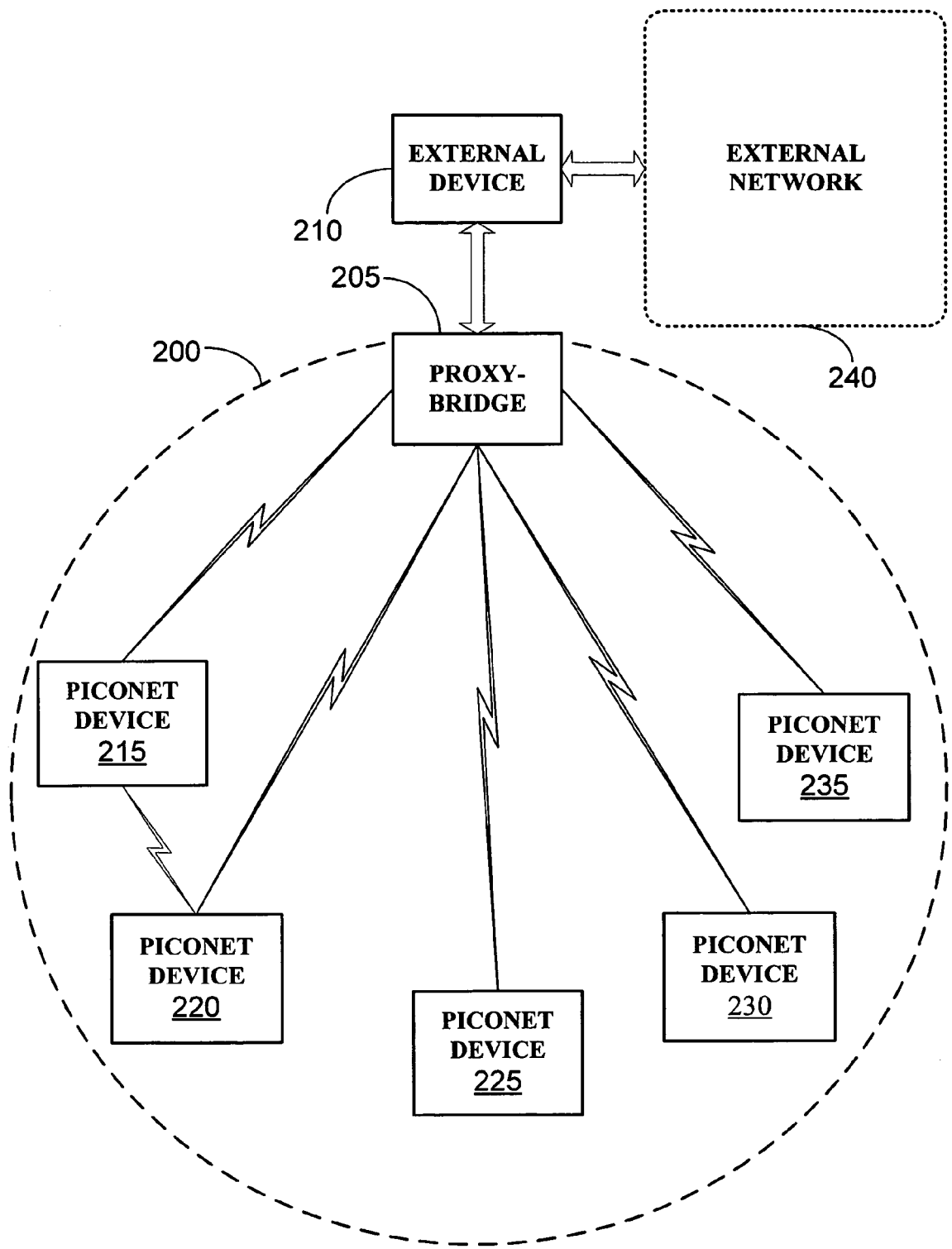
FIG. 2 illustrates a typical piconet connected to an external device via a proxy-bridge device in the piconet.

FIG. 2 illustrates a piconet 200 coupled to an external device 210 via a proxy-bridge device 205 in the piconet 200. The piconet comprises devices 215, 220, 225, 230 and 235 communicating with the proxy-bridge device 205 and each other over a common channel using a proprietary protocol different from the protocol used by the proxy-bridge device 205 for communicating with the external device 210. Devices 215-235 may also be capable of directly communicating with the external device 210 although in the piconet 200 they are accessed by the external device through the proxy-bridge device 205. The external device 210 has a connection to the proxy-bridge device 205 and an external network 240. However, the preceding description is not intended to limit the scope of the invention. For instance, in an alternative embodiment the external device 210 may connect to the proxy-bridge device 205 over a network rather than a direct link, or over a wireless link. Moreover, the external device need not be connected to a wired LAN. Instead, the external device and the proxy-bridge device could use IP addresses from the autonet range for communicating with each other.

Figure 3:
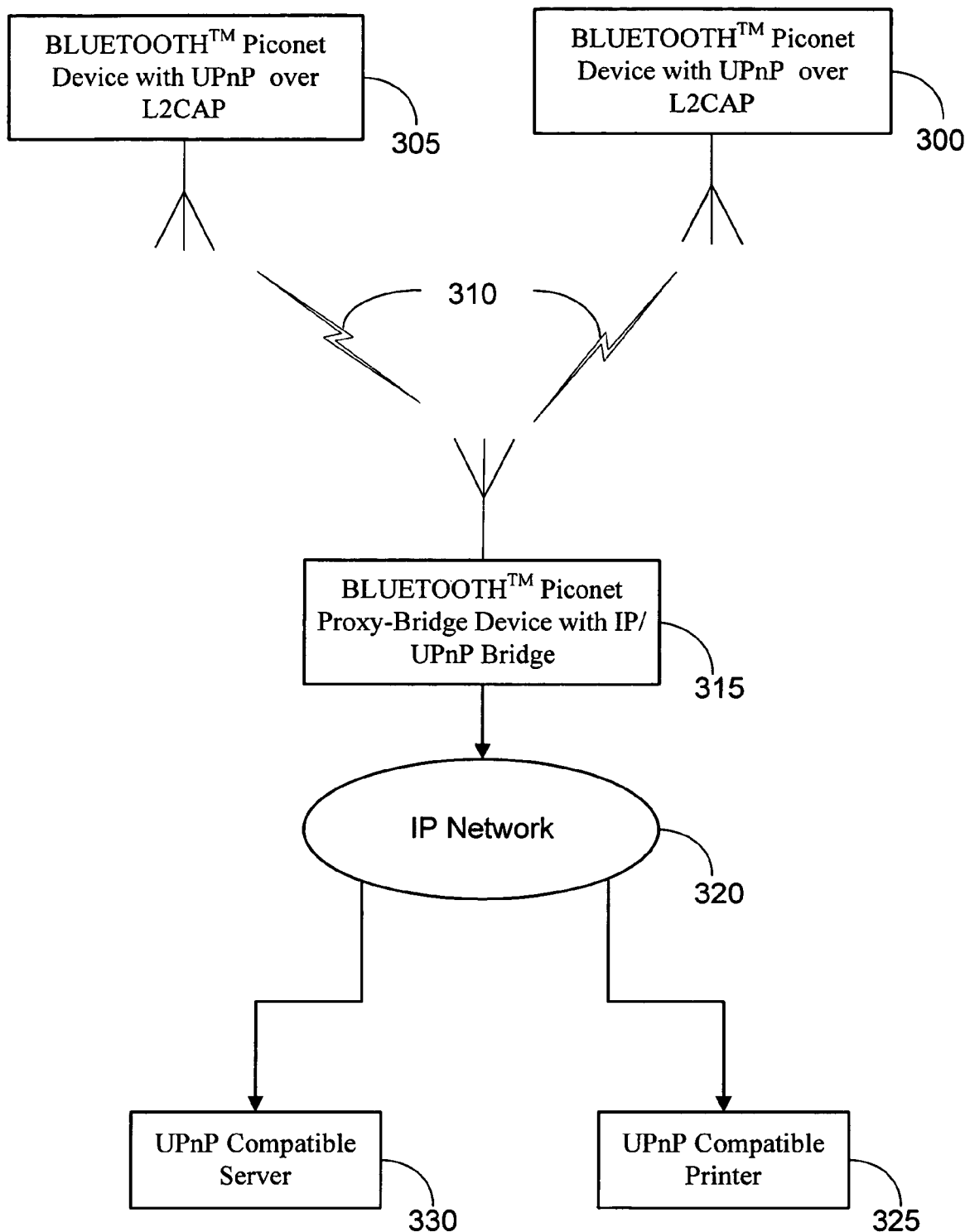
FIG. 3 illustrates an exemplary BT compliant piconet connected to a remote device via a proxy-bridge device.

Turning to FIG. 3, BT devices provide an example of piconet devices. Some BT devices include IP support while other BT devices, with far more limited computing resources, lack IP support. Both kinds of BT devices are capable of communicating with each other and forming a piconet. BT devices lacking IP support are likely to have limited computing capabilities. In an embodiment of the invention the BT stack within such devices is modified to provide support for the UPnP functionality.

FIG. 3 illustrates an exemplary BT compliant piconet connected to a remote device via a proxy-bridge device. In FIG. 3, BT devices 300 and 305 communicate via wireless connections 310 to a proxy-bridge device 315. The proxy-bridge device 315 provides access via network 320 to server 330 and printer 325. BT devices 300 and 305 communicate with each other as well to form a piconet having devices 300, 305 and the proxy-bridge device 315.

Figure 4:
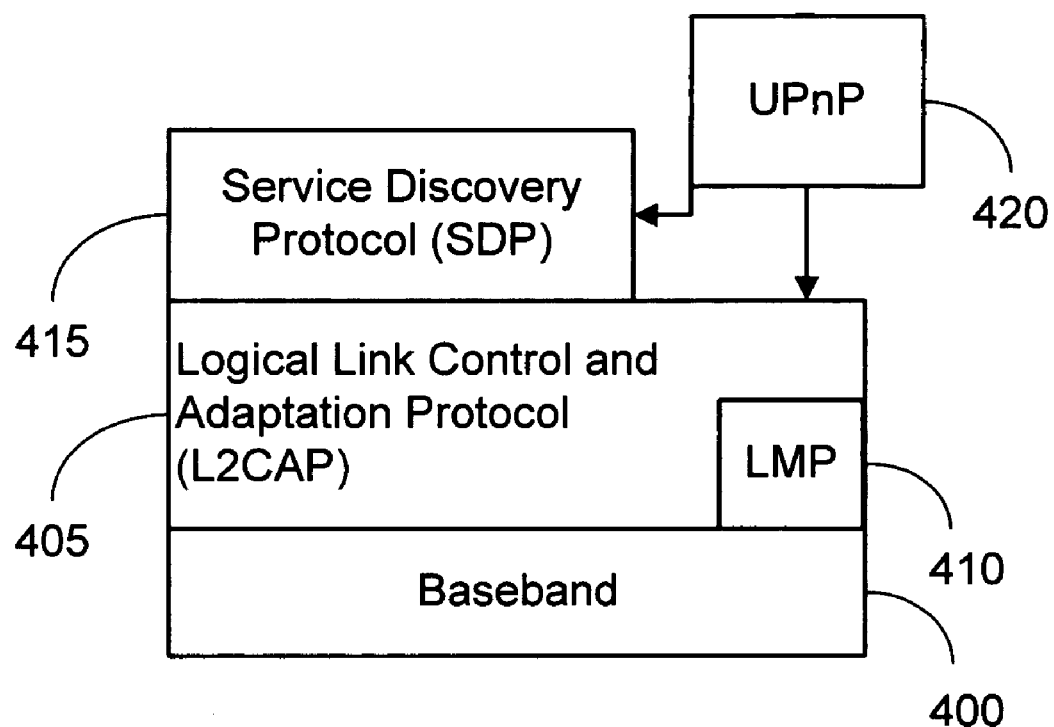
FIG. 4 illustrates an exemplary BT compliant stack with universal plug and play functionality.

FIG. 4 illustrates an exemplary BT compliant stack. The physical layer corresponds to the baseband 400 immediately above that are the logical link control and adaptation protocol (L2CAP) layer 405 and the LMP layer 410. The service discovery protocol (SDP) 415 operates on top of L2CAP 405. SDP does not provide for using services discovered with its aid and instead additional applications are required to actually use the services. Universal plug and play (UPnP) functionality 420 is provided on top of L2CAP 405 and in association with the SDP 415 conveniently provides functionality to use services in addition to discovering and announcing availability of services.

SDP 415 does not provide a mechanism for a BT environment to announce the availability of new services. Therefore, a polling routine updates the list of available services within its BT environment. L2CAP 405 layer provides connection-oriented and connectionless data services between BT devices over Asynchronous Connection-Less (ACL) links. SDP 415 uses L2CAP 405's connection-oriented (CO) transport protocol to communicate with other BT devices within a piconet. Since L2CAP 405 does not support networking functions between piconets, it limits the discovery of services to the active BT devices in a given piconet. Service discovery is extended by the UPnP 420 functionality.

UPnP functionality 420 provides seamless, media independent, peer-to-peer device connectivity and control. UPnP is a computing, electronics, telephony and networking industry initiative enabling connectivity among stand-alone devices and PCs from many different vendors. These UPnP characteristics make it suitable as a BT extended service discovery protocol (ESDP) for providing an enhanced mechanism for service discovery and control beyond a piconet domain. Accordingly, SDP 415 provides service records indicating the availability of UPnP functionality in a BT device. Since BT devices lack IP support, the UPnP functionality 420 is supported over the L2CAP layer.

Since the proposed BT devices have UPnP functionality 420, they can engage in seamless peer-to-peer device connectivity, service discovery, and control within their piconet. ESDP includes UPnP functionality 420 to augment SDP 415 in the proposed BT devices. However, UPnP functionality includes a Simple Service Discovery Protocol (SSDP), an IP multicast based discovery protocol, HTTP and XML. Native BT L2CAP layer 405 does not provide IP or the multicast channel support. Therefore, in order to adapt UPnP functionality, the SSDP functions are supported over the L2CAP layer along with HTTP and XML functioning over the L2CAP layer to enhance BT devices with UPnP functionality layered over the native BT L2CAP layer.

Figure 5:
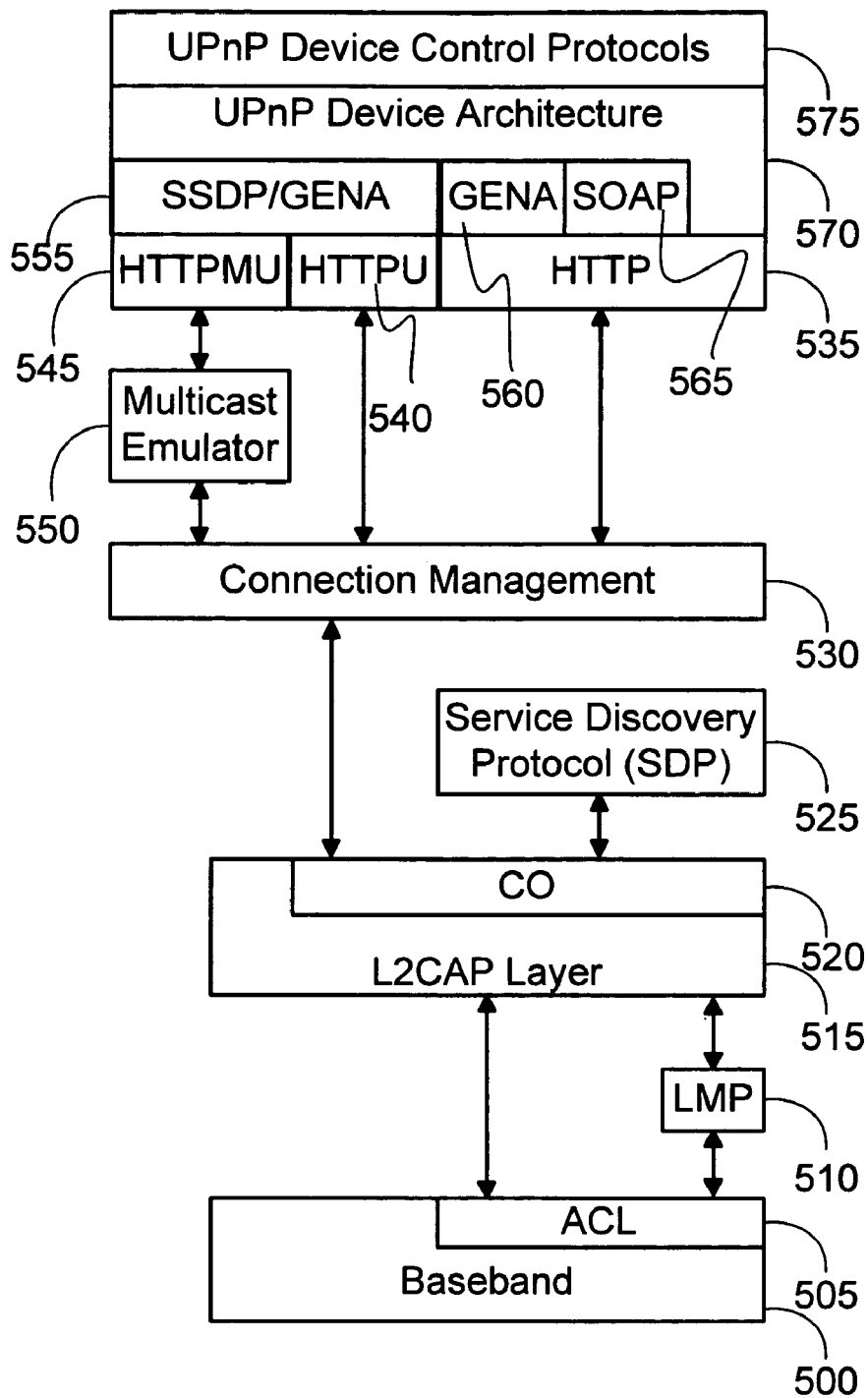
FIG. 5 illustrates details of an exemplary BT compliant stack with universal plug and play functionality including support for multicasting and connection management.

FIG. 5 illustrates an exemplary BT compliant stack with additional details for providing support for various UPnP features in a suitably modified BT protocol stack. An Asynchronous Connectionless Link (ACL) 505 retrieves and places, via the baseband layer 500, packets on the wireless medium. A Logical Link Control and Adaptation Protocol (L2CAP) layer 515 uses the ACL 505 to carry UPnP messages over the air-interface to another BT device. The ACL 505 is under the control of a Link Manager (LM) 510 for establishment of a link. The LM 510 facilitates authentication of the machines establishing the link along with generation of keys to be used over the connection. The L2CAP layer 515 interfaces with the LM 510 and establishes a channel using the link managed by the LM 510. The L2CAP layer 515 interfaces with a Service Discovery Protocol 525 via a connection oriented 520 module. A connection management module 530 establishes a single connection to the L2CAP layer 515 via a connection oriented 520 module such that each BT device has only one connection with another BT device. Consequently, the UPnP Device Control Protocols 575 are provided from a particular device to another device over only one connection.

In an embodiment of the invention, the connections to remote devices are provided through Network Device Interface Specification (NDIS) conforming driver software. As is known by those skilled in the art, NDIS provides a library of interfaces between various levels of driver software components and the corresponding hardware components to define a fully abstracted environment for network interface card (NIC) driver development. Thus, NDIS provides and standardizes the interfaces for communication between a NIC driver, an overlying protocol driver, and the underlying NIC hardware itself. An NDIS driver accepts requests and creates responses that conform to the NDIS interfaces.

To enable the use of NDIS interfaces over a broad range of networking hardware, the Remote Network Device Interface Specification (RNDIS) carries NDIS messages over a number of different transport mechanisms. As described in more detail in co-pending application, Ser. No. 09/302,735, entitled "Method and System for Abstracting Network Device Drivers" by Hyder et al., filed on Apr. 30, 1999, which is incorporated herein by reference in its entirety, and assigned to the assignee of the present application, RNDIS provides extensibility without changing the bus specific message transport mechanisms. RNDIS also provides a reliable driver architecture for both networking and external bus device models.

When UPnP Device Control Protocols 575 address multiple devices, then a Multicast Emulator 550 manages multicasting by sending a sequence of unicast messages to the various devices in a piconet. This is an efficient strategy because a piconet only has a few devices, and consequently the overhead of managing multicast messages by multiple messages is relatively insubstantial. However, this is an implementation detail in the aforementioned exemplary embodiment and is not intended to be a limitation. Other embodiments of the invention implement multicasting as a message to a master device in the piconet that sends a global message recognized by all the devices in the piconet or even a true multicast message to which each device in the piconet responds if required.

The UPnP Device Control Protocols 575 and an underlying UPnP Device Architecture 570 interact with the BT protocol stack using Hypertext Transfer Protocol Multicast (HTTPMU) 545, Hypertext Transfer Protocol Unicast (HTTPU) 540 and Hypertext Transfer Protocol (HTTP) 535. This interaction enables implementation of Simple Service Discovery Protocol (SSDP) and General Event Notification Architecture (GENA) 555, just GENA 560 and Simple Object Access Protocol (SOAP) 565 of UPnP in a BT protocol stack. The BT protocol stack supports functions required by HTTP without supporting TCP/IP frames for sending and receiving HTTP compliant information packets. This scheme suits wireless devices because the TCP guarantees of packet delivery, and hence HTTP compliant information contained therein, are less significant since wireless connections normally include acknowledgment of packet delivery, just as the Connection Management 530 layer ensures data integrity to upper layers of the stack.

If two BT devices communicate, each device supporting the protocol stack depicted in FIG. 5, then logical connections can be established between different modules. Thus, the LM 510 in one device is able to communicate with the LM 510 in the other device using the underlying layers in a manner known to those of ordinary skill in the art. Accordingly, the UPnP functionality is able to use the BT stack to provide UPnP functionality over the logical connection between the respective UPnP Device Control Protocols 575 on each device and the like. Moreover, prior to using the UPnP functionality a BT device discovers another BT device providing support for the UPnP functionality via SDP 525. SDP 525 merely provides information about the existence of the requested service. Therefore, the application level modules, UPnP Device Control Protocols 575, and UPnP Device Architecture 570 handle subsequent operations via the BT protocol stack.

Figure 6:
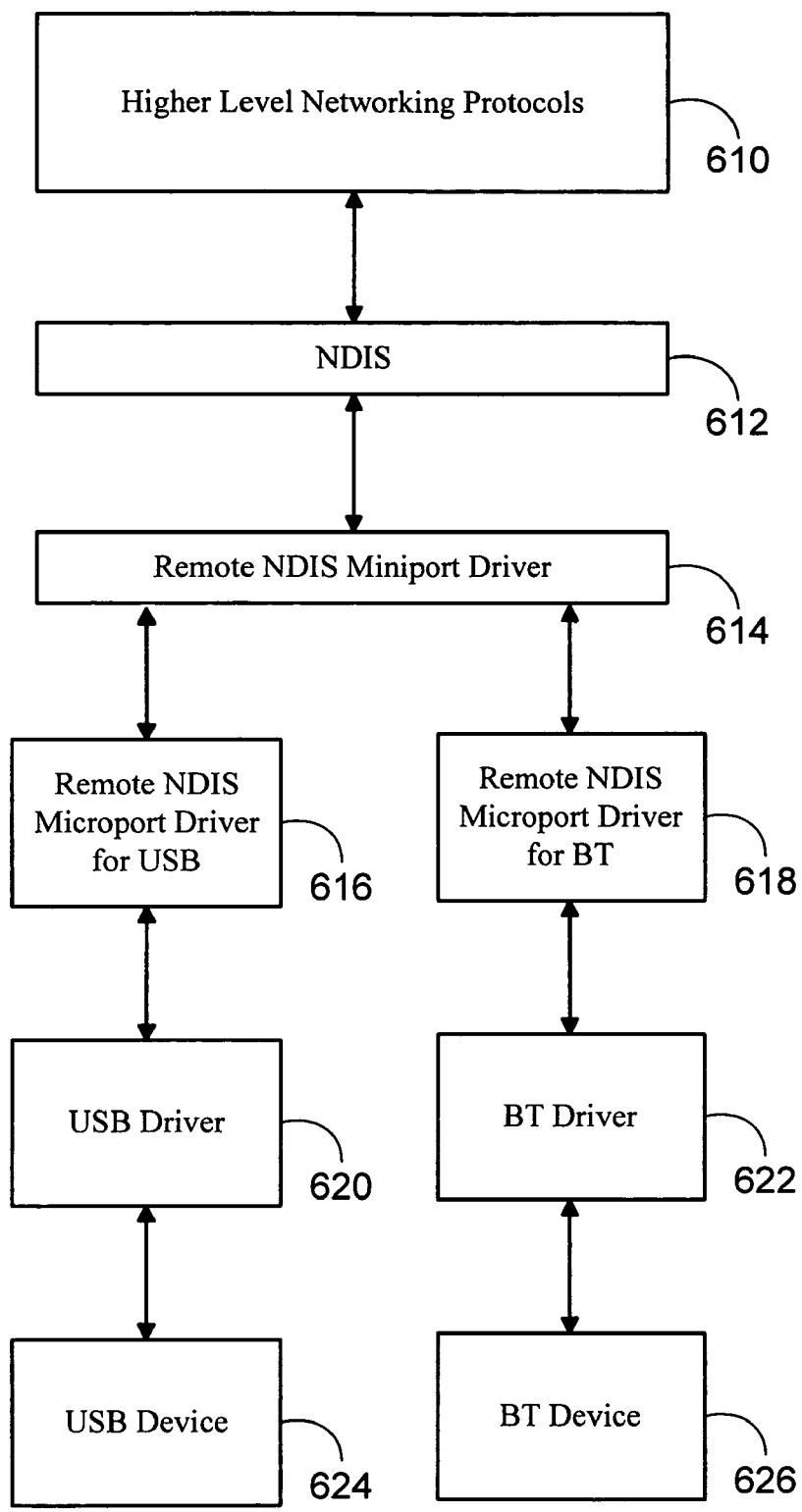
FIG. 6 illustrates an exemplary stack in a BT proxy-bridge device with support for universal plug and play functionality over IP and the BT stack.

Turning to FIG. 6, a system generally illustrating the structure of an RNDIS networking stack is shown. An RNDIS miniport driver 614 receives and responds to NDIS requests from higher-level protocols 610, communicated through NDIS 612. However, the miniport driver 614 is bus independent because of the existence of bus-specific microport drivers, such as microport drivers 616 and 618. Microport driver 616 provides a USB-specific implementation for translating communication between the underlying USB software and hardware and the RNDIS miniport 614. Similarly, microport driver 618 provides a BT-specific implementation for translating between the underlying BT software and hardware and the RNDIS miniport 614. In such a manner, the RNDIS miniport can be bus-independent, merely requiring a small microport to provide bus-specific functionality. Such a system provides significant efficiencies because the same miniport can be used with many different networking environments, so long as a specific microport exists.

HTTP 535 of FIG. 5 is one of the higher level networking protocols 610 in FIG. 6. The connection management layer 530 is implemented in RNDIS miniport driver 614, and the L2CAP layer 515 is implemented in the RNDIS microport driver for BT 618. Alternatively, the connection management layer 530 is implemented solely in the RNDIS microport driver for BT 618, or through processes performed in both the microport driver 618 and the RNDIS miniport driver 614. The BT specific aspects are provided by the RNDIS microport driver for BT 618. Thus, the RNDIS miniport driver 614 remains connection neutral.

As known to those having ordinary skill in the art, the BT L2CAP layer does not provide flow control to prevent the overflow of data buffers, nor does it enforce a reliable channel to ensure data integrity. In this exemplary embodiment, the connection management layer 530, contained within the BT-specific microport 618, performs such functions. The connection management layer 530 limits itself to a single connection simplifying connection and buffer management. Alternatively, the connection management layer 530 supports multiple connections—though with less efficiency. The connection management layer 530 and the BT-specific microport 618 communicate with the higher-level RNDIS miniport driver 614. Communication at the lower level occurs through the L2CAP channel established between a BT device and a host device. Such communication takes, by the way of example, the form of L2CAP packets of FIG. 10 herein.

Figure 7:
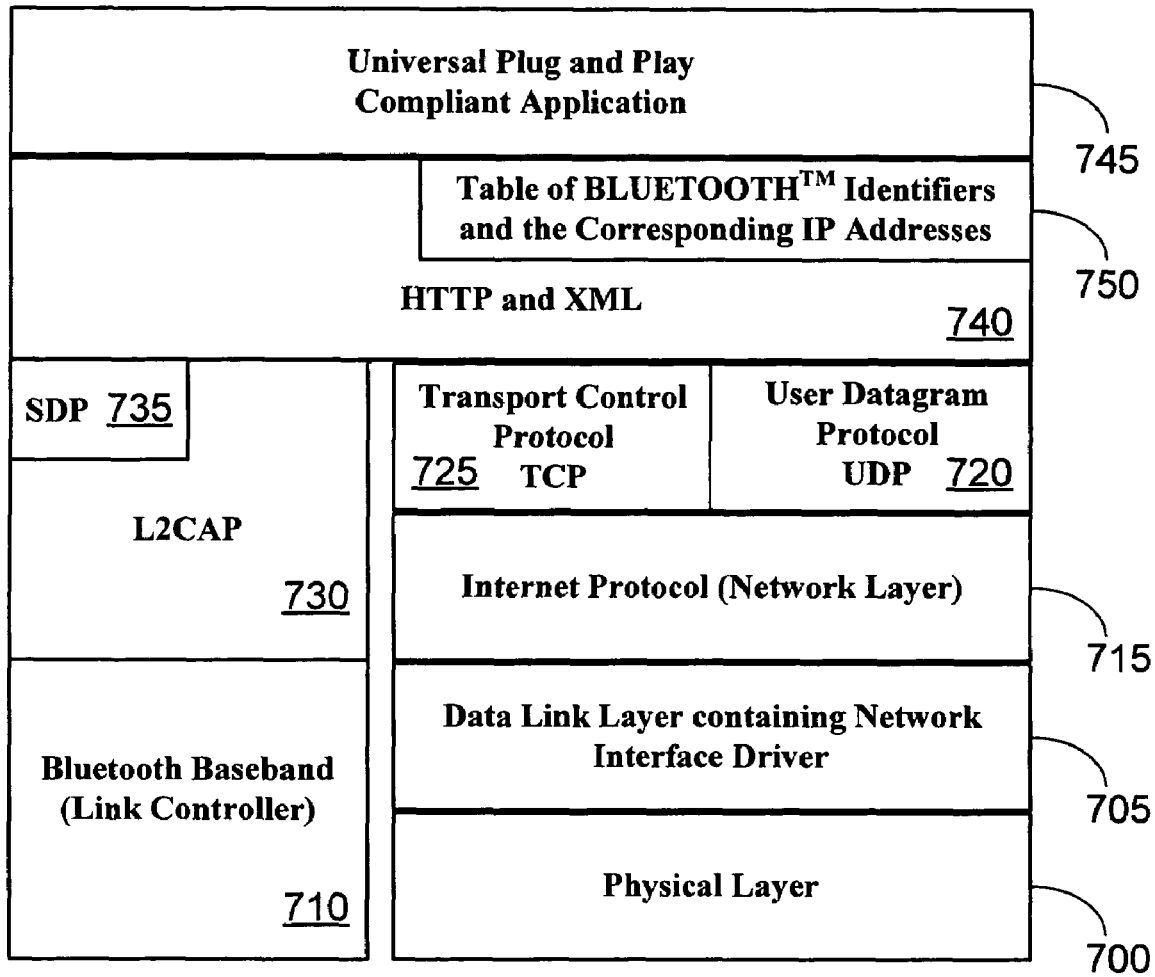
FIG. 7 provides a flow diagram in an exemplary embodiment of the invention illustrating a method for providing extended service discovery to BT devices in a piconet without requiring the additional overhead for supporting IP or the TCP/IP suite on each device.

FIG. 7 illustratively depicts an exemplary protocol stack configuration in a BT proxy-bridge device such as the proxy-bridge device 205 of FIG. 2 or 315 of FIG. 3. The stack includes support for both BT compatible processing and IP compatible processing in customary networks. The physical layer 700 and the data link layer 705 in the standard OSI specification corresponds to the baseband layer 610 in the BT stack. The Internet Protocol (IP) 715 is above the datalink layer 705. TCP 720 and UDP 725, in turn, are above the IP layer 715. The corresponding layer in the BT compatible stack, similar to the BT protocol stack of FIG. 5, is the L2CAP layer 730 along with the SDP 735 functionality. Support for HTTP and Extensible Markup Language (XML) 740, required for UPnP in both the BT and IP supporting stack, is the next layer, and with the UPnP application 745 is at the top of the BT proxy-bridge device stack.

Each BT compatible device has a unique identifier (BT ID). This identifier is mapped into an IP address by a proxy-bridge device. In an embodiment of the invention a table 750 provides a ready reference to the mapping between the IP address and the BT ID. Table 750 can be accessed via the HTTP and XML 740 layer or the UPnP functionality 745. This, however, is not intended to be a limitation on the intended scope of the invention. For instance, alternative embodiments of the invention implement table 750 such that it has additional or fewer interfaces. The mapping in table 750 allows external devices to interact with a proxy-bridge device to access BT compatible devices lacking IP support with the aid of the IP address without having the BT device being aware of the mapping. Such transparent services reduce the number of devices and software that need to be modified to provide outside access to BT devices via the proxy-bridge. Furthermore, the proxy-bridge device represents the external device to the BT devices, thus permitting the BT devices lacking IP support to access external devices.

An external device accessing a piconet via the proxy-bridge device is presented with services offered by the devices in the piconet and corresponding IP addresses for requesting the same without the piconet devices being aware of the IP address assignment.

Figure 8:
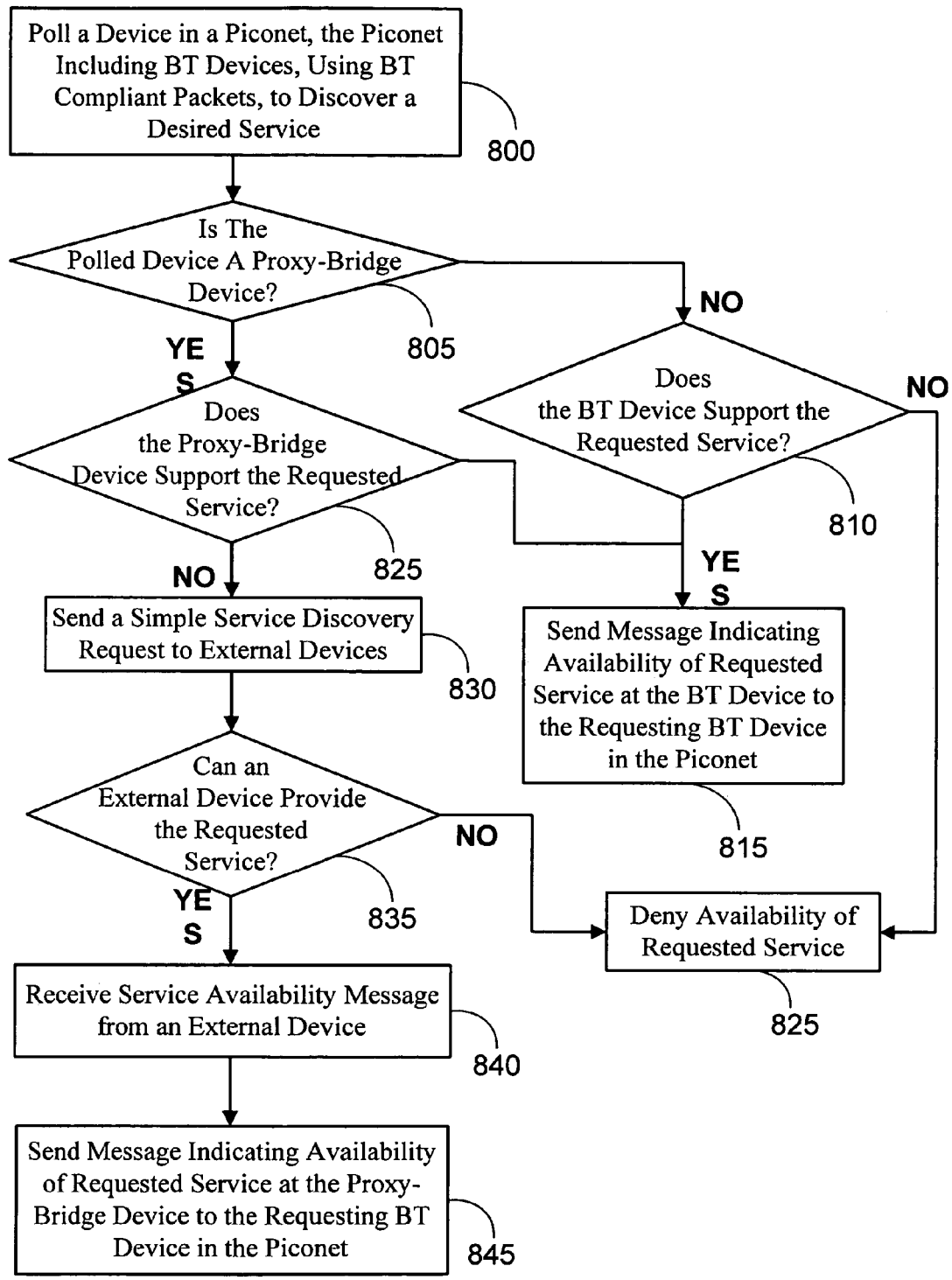
FIG. 8 summarizes steps, in an exemplary embodiment of the invention, for providing access, to services offered at devices in a piconet, to external devices via a proxy-bridge device in the piconet.

FIG. 8, without intending to limit the invention, provides an exemplary flow diagram illustrating a method for providing extended service discovery of BT devices in a piconet without requiring the BT devices to adopt the additional overhead for supporting IP or the TCP/IP suite. During step 800 a BT device is polled for discovery of a service. The polling or discovery request could be via SDP of BT or Simple Service Discovery Protocol ("SSDP") of UPnP. Next, during step 805 if the polled device is not a proxy bridge device, control flows to step 810. During step 810 if the device provides the requested service then control flows to step 815. The polled device sends a message during step 815 indicating availability of service to the requesting device. On the other hand, if the requested service is not available on the polled device, as determined during step 810, then the request times out to deny the service during step 820. Alternative embodiments include an affirmative denial message rather than timing out the request. Such affirmative denial messages deny some or all types of services in combination with timing out certain service requests in alternative embodiments of the invention. Of course, timing out service discovery messages instead of sending a denial message reduces traffic and potentially improves the response time.

If during step 805 the polled device is a proxy-bridge device, then control flows to step 825. During step 825, in a manner similar to step 810, if the proxy-bridge device supports the requested service, then control flows to step 815, during which a message is sent indicating that the service is available. On the other hand, if the proxy-bridge device does not provide the requested service then the control flows to step 830 from step 825. During step 830 the proxy-bridge device queries external device(s) to determine if the requested service is available outside the piconet. This query is possible since the proxy-bridge device provides support for the piconet protocol and the TCP/IP suite with UPnP on top of the stack providing SSDP. Therefore, the availability of the UPnP SSDP protocol enables querying external devices supporting UPnP functionality for a service of interest.

During step 835 if the external device can provide the requested service, then control flows to step 840. The proxy-bridge device receives a message from an external device during step 840 indicating that the requested service is available outside the piconet. A service availability message is sent to the requesting device during step 845 such that the service appears to be provided by the proxy-bridge device. In other words, the proxy-bridge device acts as a proxy for the external device actually providing the service.

Failure to receive a response at the proxy-bridge device results in timing out the query to the external device and the control returns to step 820 from step 835 resulting in a denial of service.

Figure 9:
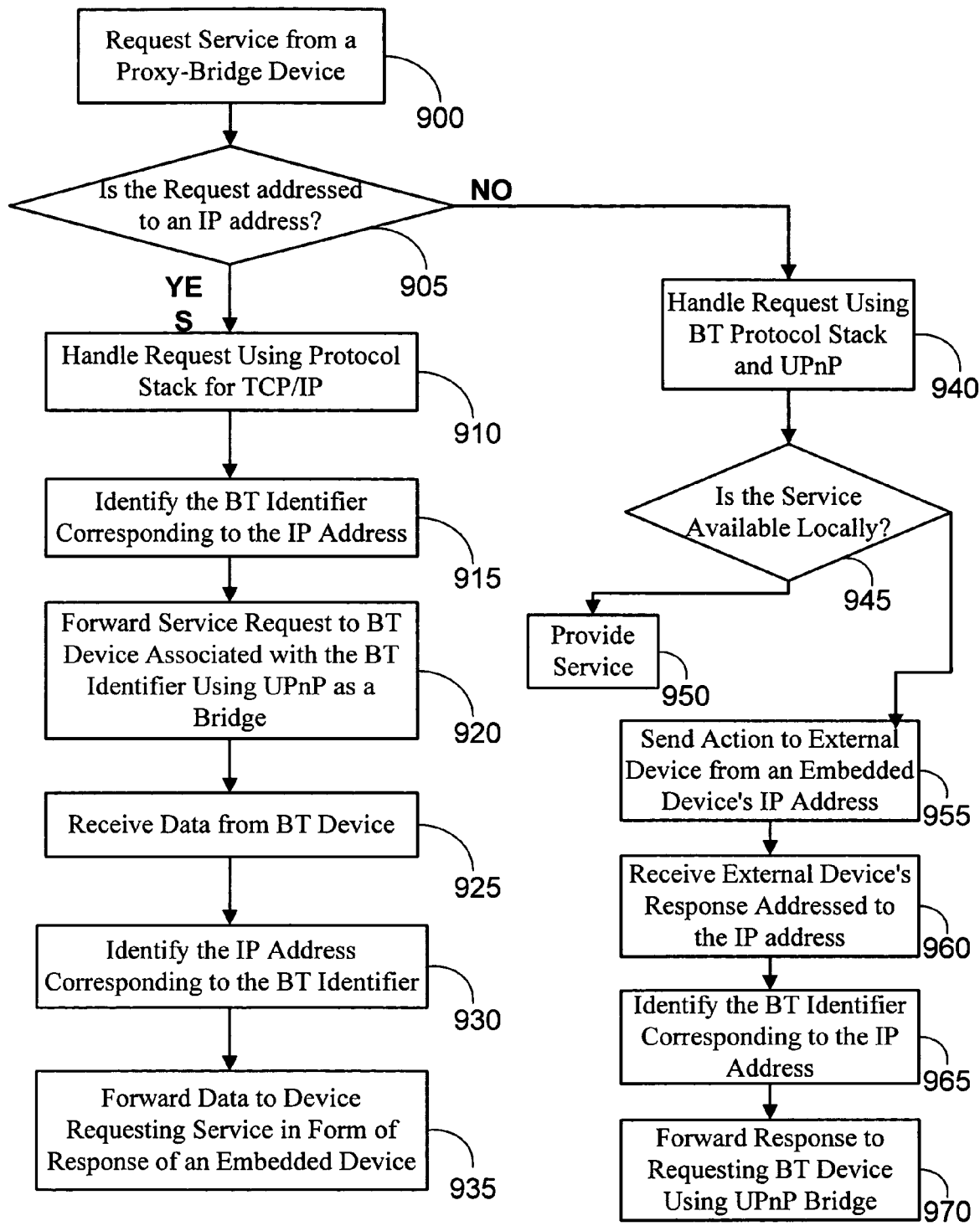
FIG. 9 illustrates a block layer diagram of a network system in which the present invention can be used.

FIG. 9 summarizes exemplary steps for requesting services from a proxy-bridge device. The requesting device is, for example, a BT device or an external device. During step 900 a service is requested from a proxy-bridge device. This differs from seeking to discover whether a service is available. During step 905 if the request is addressed to an IP address (rather than the BT ID) then it is likely that the requesting device is outside the piconet or is a BT device supporting TCP/IP. Consequently, the control flows to step 910 from step 905. The service request is handled using the TCP/IP protocol stack, for example the protocol stack illustrated in FIG. 7. UPnP functionality 745, at the top of the protocol stack of FIG. 7, identifies the BT ID corresponding to the IP address using a lookup table during step 915. An example of a suitable table is the table 750 in FIG. 7. It should be noted that in alternative embodiments of the invention the identification of the BT ID corresponding to the IP address is performed by another functionality or be skipped altogether, for instance when the IP address is the IP address of the proxy-bridge device itself. Following the identification of the BT ID of the BT device from which service is requested, the proxy-bridge device forwards the service request to the target BT device during step 920.

In response to the service request, during step 925, the BT device sends data to the proxy-bridge device. To the BT device the proxy-bridge device is just a BT device functioning as the master device in the piconet. In order to forward the data to the service-requesting device, the proxy-bridge device, during step 930, identifies the IP address corresponding to the BT ID of the BT device that sent the data during step 925. Next, during step 835, the data is sent to the external device as if it originated from an embedded device in the proxy-bridge device with the IP address determined during step 930. This IP address should be same as the IP address used for the device from which the service was requested during step 900.

On the other hand, if during step 905 the service request is not directed to an IP address, then the BT protocol stack, for example the BT protocol stack in FIG. 7, handles the service request during step 940. During step 945 the proxy-bridge device determines whether the service is available locally. If the service is available locally, then the proxy-bridge device provides the service during step 950. On the other hand, if the service is not available locally, then control passes to step 955. During step 955 an action request for the service is sent to an external device using the BT device's IP address, as assigned by the proxy-bridge device. From the point of view of the external device, the service request originates from an embedded device within the proxy-bridge device. Thus, the proxy-bridge device acts as a proxy for the requesting BT device during the aforementioned interactions with external devices.

The proxy-bridge device receives the response from the external device during step 960 and determines, during step 965, the BT identifier of the requesting BT device followed by forwarding the response to the BT device during step 970. It should be noted that the step of converting from an IP address to a corresponding BT address and vice versa is similar to the steps 915 and 930.

Figure 10:
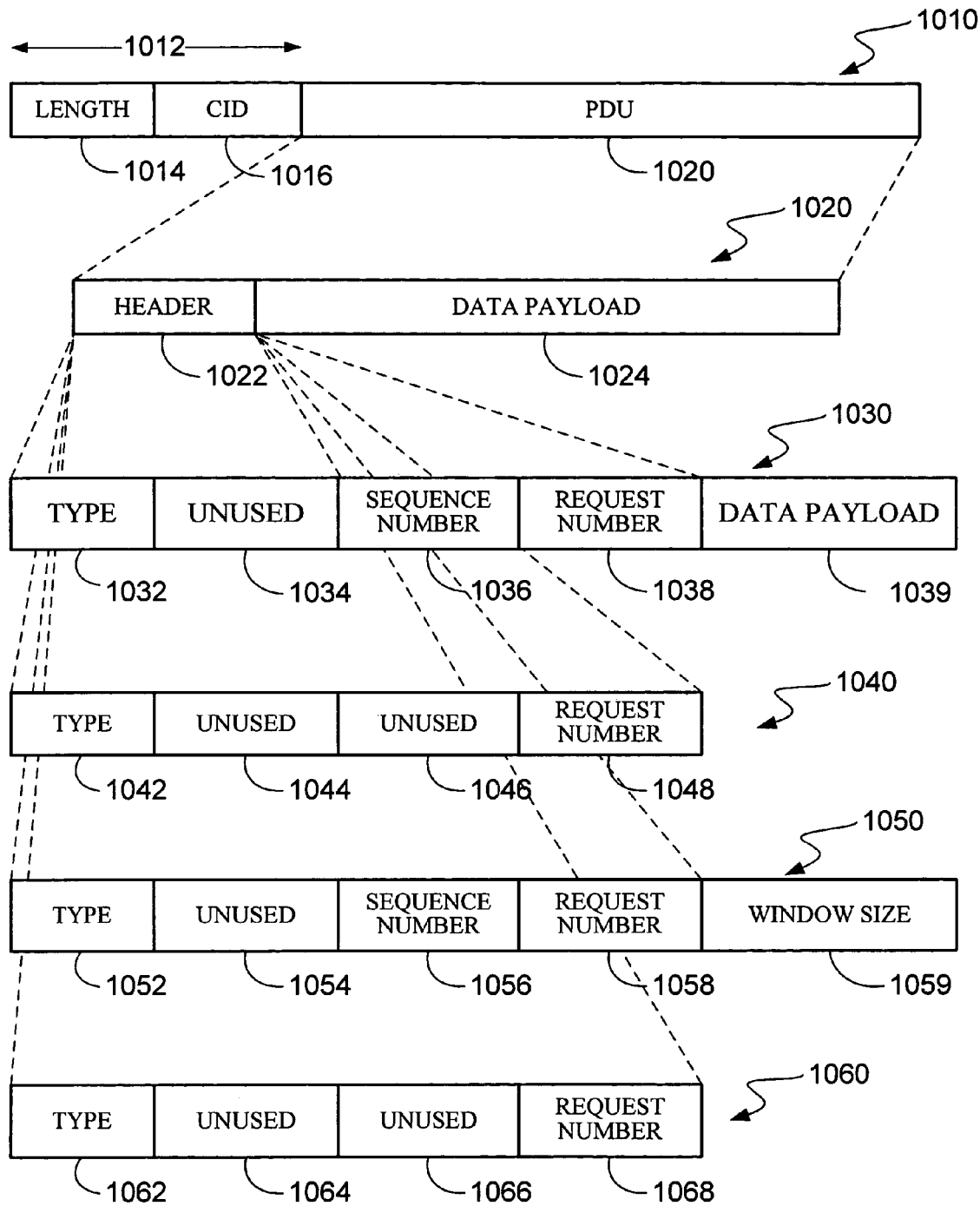
FIG. 10 illustrates a packet structure for use in the present invention.

FIG. 10 shows an exemplary L2CAP packet 1010 suitable for practicing the invention with reduced bandwidth demands. The L2CAP packet contains header information 1012 that includes a length 1014 of the packet and a Connection IDentifier (CID) 1016. In the exemplary embodiment, the length 1014 of the packet is expressed in two bytes, and the CID 1016 is expressed in two bytes. The remaining information is a protocol data unit (PDU) 1020, which can be as large as the minimum supported Maximum Transmission Unit (MTU) for the connection-oriented L2CAP packets. The minimum supported MTU is negotiated during the L2CAP channel configuration. Because the information contained in the PDU header 1022 can be as large as three bytes, the minimum supported MTU must be greater than four bytes. Thus, if the minimum supported MTU is negotiated to be four bytes or less, the connection management layer 530 terminates the L2CAP connection and indicates the lack of a connection to the higher-level software.

As shown in the example of FIG. 10, the PDU 1020 contains a header 1022 and a data payload 1024. Two different PDU structures are used. One PDU structure carries both data and acknowledgements, and another returns acknowledgements when there is no other data being transmitted with which the acknowledgement can be sent.

An information PDU carrying both data and acknowledgements is shown in FIG. 10 as PDU 1030. As can be seen, a header 1022 consists of a four-bit type field 1032, an unused four bits 1034, an eight bit sequence number 1036, and an eight bit request number 1038. The first bit of the type field 1032 is used to indicate whether the PDU is an information PDU or a control PDU. For example, a binary 0 indicates that the PDU is an information PDU, and a binary 1 indicates that the PDU is a control PDU. As might be appreciated, other embodiments of the invention employ alternative values for the type field. Similarly, the second bit of the type field 1032 indicates whether the PDU contains both data and an acknowledgement, or only an acknowledgement. Thus, a binary 1 indicates that the PDU only carries an acknowledgement of receipt of the previous packet, and a binary 0 indicates that the PDU contains both an acknowledgement and additional data. The eight-bit sequence number 1036 is an identifier of the data contained in the packet, and is incremented each time another packet of data is sent. The eight-bit request number 1038 also implicitly acknowledges proper receipt of all of the data with sequence numbers less than the request number. Sending the request number to both specify the next frame and acknowledge received frames results in greater efficiency.

Should it be necessary to acknowledge receiving a packet, without the need to send additional data, an information PDU carrying only an acknowledgement suffices. An information acknowledgement PDU 1040, as shown in FIG. 10, contains a header 1022, but no data field and maintains a BT channel when there is no data to be transmitted by providing activity to keep the channel open. The header 1022 of the information acknowledgement PDU 1040 contains a type field 1042 four bits long, an unused field 1044, also four bits long, another unused field 1046 of eight bits in length, and a request number field 1048 eight bits long. The type field 1042 is analogous to type field 1032, described in detail above. The unused field 1046 replaces the sequence field 1036, which is not necessary for PDU 1040, as there is no data being carried which needs to be sequenced properly. The request number field 1048 carries the identifier of the data that is sent in return, and, more importantly, acts as the implicit acknowledgement of the proper receipt of all of the packets with sequence numbers less than the request number.

In a manner analogous to information PDUs 1030 and 1040 described above, control PDUs 1050 and 1060 transmit information regarding the flow control of the packets. Control data PDU 1050 contains the PDU header 1022 and a data field 1059, while control acknowledgement PDU 1060, contains only the header 1022. The header 1022 for the control PDUs 1050 and 1060 is identical in format to that of the information PDUs 1030 and 1040, described in detail above. However, unlike the information PDU data field 1039, the control PDU data field 1059 is only eight bits in length since it carries the size of the transmission window. Should a receive buffer for data information PDUs become full, a window size of zero can be requested as a stop indication.

Both information and control PDUs are segmented and reassembled in the connection management layer 530, shown in FIG. 5. Given a window size of n, at most n information PDUs can be outstanding in the piconet. Each time a request number is received, indicating the proper receipt of each PDU with a sequence number less than the request number, the number of outstanding PDUs in the piconet decreases. If a particular information PDU times out without having received an acknowledgment then the go back n auto repeat request (ARQ) protocol initiates the retransmission of information PDUs starting with the sequence number of the information PDU that timed out.

The flow control for control PDUs is similar to the information PDU flow control described in detail above, except that the transmit and receive window sizes for control PDUs are set to 1 and cannot be changed. Thus, control PDU transmissions use a go back 1 ARQ protocol. This ensures that there is only one control PDU outstanding at any given time.

Briefly, if the external device sends an action request for a service to a piconet device identified by an assigned IP address, the proxy-bridge device forwards the request, to the corresponding BT device. To the BT device the action request appears to have been generated by the proxy-bridge device itself. Thus, the proxy-bridge device acts as a proxy for the external device. This step ensures that the limit on the number of devices that BT devices actively connected to a given BT device is not violated.

Similarly, data sent by the BT device in response to an action request is forwarded to an originating external device by the proxy-bridge device. Thus, to the external device the proxy-bridge device appears to have several logically embedded devices. To the devices in the piconet the proxy-bridge device hides the presence of an external device and instead provides services offered by external devices as well as serving as a bridge between the BT frames and the IP frames for sending and receiving data to and from an external device.

The invention includes modification of the BT protocol stack to provide UPnP functionality without requiring support for IP. BT devices with aforementioned modifications to their protocol stacks can participate in piconets, use UPnP to discover services from each other and use polling to update the state of other BT devices lacking UPnP. Moreover, the invention includes proxy-bridge BT devices. A proxy-bridge device acts as a bridge to the extent it allows UPnP compliant requests to be forwarded onto a piconet using BT compliant frames rather than IP and vice versa. The proxy-bridge device acts as a proxy for an external device requesting services from one or more BT devices in a piconet while the proxy-bridge device can also act as a proxy for a BT device in the piconet for accessing external devices and services.

The proxy-bridge device functions as a proxy for a piconet device accessing services external to the piconet by presenting such services as part of its own profile. Thus, the piconet device does not need to obtain an IP address to communicate with an external device because the proxy-bridge device manages addresses transparently. To the external device the piconet device has an IP address while to the piconet device the services, actually provided by the external device, are provided by the proxy-bridge device and discovered by polling the proxy-bridge device. Consequently, the invention allows all BT devices to interact transparently with external services and each other.

Still another feature of the present invention is a computer-readable medium having computer-executable instructions for performing a plurality of the steps illustrated in, for instance, FIG. 8 and FIG. 9 in the course of practicing the invention.

In view of the many possible embodiments to which the principles of this invention may be applied, it should be recognized that the embodiment described herein with respect to the drawing figures is meant to be illustrative only and should not be taken as limiting the scope of invention. For example, those of ordinary skill in the art will recognize that elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

All of the references cited herein, including patents, patent applications, and publications, are hereby incorporated in their entireties by reference.

We claim:

1. A method, comprising:
    receiving a discovery of service request from a requesting device;
    transmitting the discovery of service request to one or more remote devices;
    receiving data from the one or more remote devices indicating whether a requested service is available;
    if the requested service is available from the one or more remote devices, transmitting data to the requesting device indicating that the requested service is available; and
    if the requested service is not available from the one or more remote devices, indicating to the requesting device that the service is unavailable.

2. The method as recited in claim 1, further comprising:
    determining if the requested service is available locally; and
    if the requested service is available locally, transmitting data to the requesting device that the requested service is available.

3. The method as recited in claim 1, further comprising utilizing Universal Plug-and-Play (UPnP) functionality to identify the one or more remote devices.

4. The method as recited in claim 1, further comprising utilizing UPnP functionality to identify the requesting device.

5. The method as recited in claim 1, wherein the requesting device is a wireless device.

6. The method as recited in claim 1, wherein the requesting device is a BT device.

7. The method as recited in claim 1, wherein the requesting device is a device in a piconet.

8. The method as recited in claim 1, wherein the requesting device cannot directly communicate with the one or more remote devices.

9. One or more computer-readable media containing executable instructions that, when executed, implement the following method:
    identifying one or more network devices;
    identifying one or more remote devices that cannot communicate directly with the one or more network devices;
    receiving a request from a network device for a particular service;
    determining if a remote device supports the particular service;

if a remote device supports the particular service, indicating to the requesting network device that the service is available; and if a remote device does not support the particular service, indicating to the requesting network device that the service is unavailable.

10. The one or more computer-readable media as recited in claim 9, wherein the communication with remote devices is transparent to the network devices.

11. The one or more computer-readable media as recited in claim 9, further comprising identifying one or more remote devices.

12. The one or more computer-readable media as recited in claim 11, wherein the identifying is accomplished utilizing UPnP functionality.

13. The one or more computer-readable media as recited in claim 9, further comprising:
   utilizing a remote device compliant stack to communicate with the remote device;
   utilizing a network device compliant stack to communicate with the network devices; and
   wherein the remote device compliant stack and the network device compliant stack utilizing different protocols.

14. One or more computer-readable media containing executable instructions that, when executed, perform the following method:
   receiving a service request from a remote device, the service request being directed to a network device with which the remote device is unable to communicate directly;
   determining an appropriate network device to which the service request is directed, wherein the determining step further comprises:
      determining if the service request identifies an IP address;
      if the service request identifies an IP address, identifying the appropriate network device by identifying a network device identifier that corresponds to the IP address and processing the request utilizing a TCP/IP protocol stack; and
      if the service request does not identify an IP address, processing the request utilizing a BT protocol stack; and
   forwarding the service request to the appropriate network device.

15. The one or more computer-readable media as recited in claim 14, wherein the processing the request utilizing a BT protocol stack further comprises utilizing UPnP functionality.

16. The one or more computer-readable media as recited in claim 14, further comprising:
   receiving service data from the network device; and
   if the service request identifies an IP address, forwarding the service data to the remote device in the form of a response of an embedded device.

* * * * *